No. 855,950. PATENTED JUNE 4, 1907.
E. H. HORN.
LEVER ESCAPEMENT FOR WATCHES AND CLOCKS.
APPLICATION FILED JAN. 31, 1907.

UNITED STATES PATENT OFFICE.

ERNEST H. HORN, OF WATERBURY, CONNECTICUT, ASSIGNOR TO THE WATERBURY CLOCK CO., OF WATERBURY, CONNECTICUT, A CORPORATION.

LEVER-ESCAPEMENT FOR WATCHES AND CLOCKS.

No. 855,950.   Specification of Letters Patent.   Patented June 4, 1907.

Application filed January 31, 1907. Serial No. 355,103.

*To all whom it may concern:*

Be it known that I, ERNEST H. HORN, a citizen of the United States, residing at Waterbury, in the county of New Haven and State of Connecticut, have invented a new and useful Improvement in Lever-Escapement Mechanism for Watches and Clocks; and I do hereby declare the following, when taken in connection with the accompanying drawings and the letters of reference marked thereon, to be a full, clear, and exact description of the same, and which said drawings constitute part of this specification, and represent, in—

Figure 1:
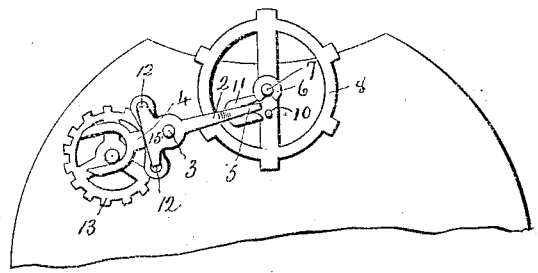
Figure 2:
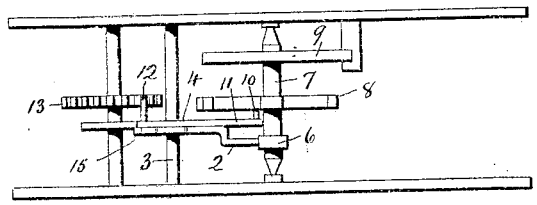
Figure 3:
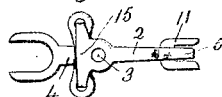
Figure 5:
Figure 4:
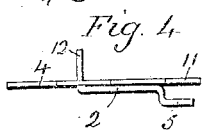
Figure 6:
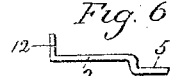
Figure 7:
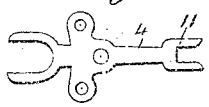
Figure 8:
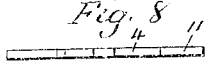

Figure 1 a broken view in elevation of a small clock-movement provided with a lever-escapement constructed in accordance with my invention. Fig. 2 a plan view thereof. Fig. 3 a detached view of the safety and impulse levers. Fig. 4 a plan view thereof. Fig. 5 a detached view of the safety-lever. Fig. 6 a plan view thereof. Fig. 7 a detached view of the impulse-lever. Fig. 8 a plan view thereof.

My invention relates to an improvement in that class of lever-escapements for watches, clocks and kindred mechanisms in which a notched safety roller mounted on the balance-staff is employed for preventing the impulse fork and impulse pin from escaping from proper operative relations.

Heretofore the safety pin or safety finger provided for co-action with the said roller has generally been made independently of and mounted directly in the impulse-lever near the fork thereof in position to enter the notch in the safety roller. Such constructions have been found objectionable for a variety of reasons, among which may be mentioned, first, the expense attendant upon mounting so small and delicate a part in the impulse lever; second, the danger of bending or otherwise deforming the impulse lever in riveting the safety pin or finger into it; third, the danger of deforming or injuring the safety pin or finger itself in riveting it into the impulse-lever; fourth, the danger of loosening the safety pin or finger in adjusting it to secure its proper coaction with the safety roller; fifth, the difficulty of refastening the pin or finger should it get loose; and sixth, the difficulty and expense of making parts so small and so delicate as a safety pin or finger with sufficient accuracy for the best results. I am also aware that a safety finger has been struck out of the impulse lever, but in this construction the finger cannot be adjusted without danger of breaking it off in which event the lever must be thrown away.

The object of my invention is to overcome these objections, and it consists in a safety-lever made entirely independent of the impulse-lever and in certain details of construction as will be hereinafter described and pointed out in the claims.

In carrying out my invention as herein shown, I employ a safety-lever 2 mounted directly upon the pallet staff or arbor 3, which also carries the impulse-lever 4, the two levers extending alongside of each other as shown in Figs. 2 and 4, though this is not essential. At its outer end the safety-lever is formed, as shown, with a safety-finger 5 which coacts in the usual manner with a notched safety-roller 6 mounted upon the balance-staff 7 which carries the balance-wheel 8 and one end of the balance-spring 9.

The balance-wheel 8 is furnished with the usual impulse-pin 10 which coacts with the impulse-fork 11 located at the outer end of the impulse-lever 4 the inner end of which is furnished with two pins 12 coacting with the teeth of the escapement-wheel 13. As shown the inner end of the safety-lever 2 is widened as at 15 so as to reach between the two escapement-pins 12 of the impulse-lever so that it will maintain its balance or poise when mounted.

It will be seen from the foregoing that my improved safety-lever 2 may be made large enough to have sufficient body not to be easily bent or broken, and that all of the strain imposed upon it in adjusting it falls on the pallet-staff or arbor 3 rather than upon the impulse-fork and impulse-lever as heretofore.

My improved safety-lever may be made in different forms according to its use, but in every case it will be made independently of the impulse-lever and mounted independently thereof in position to enter the notch in the safety roller on the balance-staff.

I claim:—

1. In a lever-escapement, the combination with the balance-wheel and the balance-staff, of an impulse-pin carried by the balance-wheel, an impulse-lever provided with an impulse fork coacting with the said impulse pin, a safety-roller mounted upon the balance-staff, and a safety-lever made independently of the said impulse-lever and extending alongside of the same into position to co-act with the said safety-roller and mounted independently of the said impulse lever but oscillating upon the same center as the same.

2. In a lever-escapement, the combination with the balance-wheel and balance-staff thereof, of an impulse-pin carried by the balance-wheel, an impulse-lever having an impulse-fork coacting with the said pin, a pallet staff or arbor on which the said impulse-lever is mounted, a safety-roller mounted upon the balance-staff, and a safety-lever coacting with the said roller and made independent of the impulse-lever and mounted upon the pallet staff or arbor.

In testimony whereof, I have signed this specification in the presence of two subscribing witnesses.

ERNEST H. HORN.

Witnesses:
CLIFFORD H. HALL,
CLEMENT I. GRIGGS.